Sept. 7, 1965 R. L. LEIGH 3,205,032
MOUNTABLE WALL TOASTER UNIT
Filed Aug. 15, 1963 2 Sheets-Sheet 1

INVENTOR.
Robert L. Leigh
BY
ATTORNEY

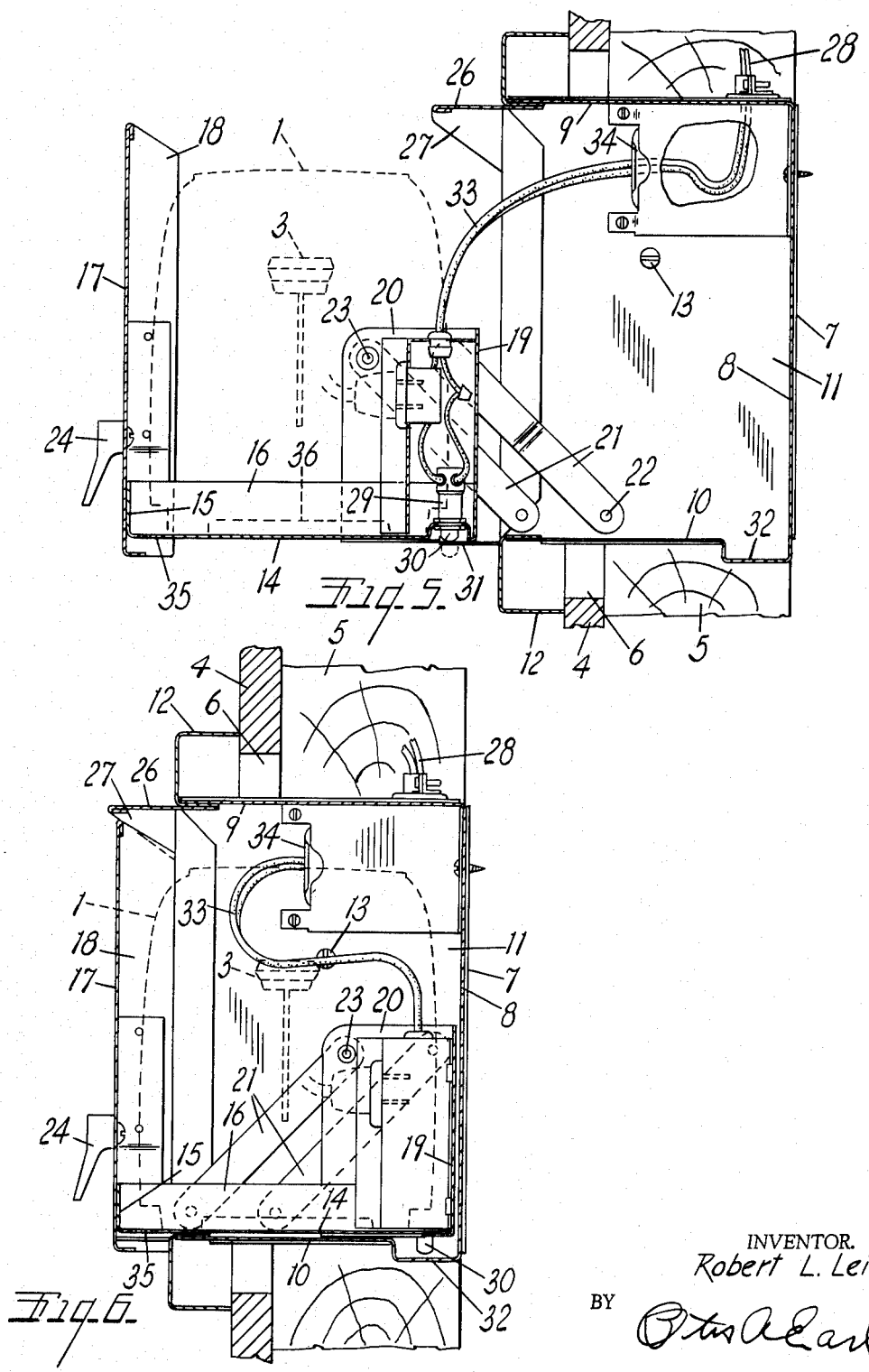

United States Patent Office 3,205,032
Patented Sept. 7, 1965

3,205,032
MOUNTABLE WALL TOASTER UNIT
Robert L. Leigh, Grand Rapids, Mich., assignor to Leigh Products, Inc., Coopersville, Mich.
Filed Aug. 15, 1963, Ser. No. 302,311
11 Claims. (Cl. 312—223)

This invention relates to a toaster apparatus adapted to be installed on a wall and mainly collapsible therein. The main objects of this invention are:

First, to provide a toaster apparatus which may be installed in a wall with the toaster support unit or portion mainly housed within the wall when not in use.

Second, to provide a toaster assembly having these advantages in which the toaster support unit is mounted so that it may be adjusted to use position by a single outward pull and to non use position by a single thrust or push movement.

Third, to provide an apparatus having these advantages in which the toaster is of the electrical type and the circuit connections are completely housed when the toaster unit is in its collapsed position and in which the electrical connections are not subjected to stress in the adjustment of the toaster unit.

Fourth, to provide a structure having these advantages including a switch which is actuated to and held in closed position by thrust thereon and automatically opens when relieved of the thrust, the apparatus having means for automatically closing the switch when the parts are adjusted to use position and the switch automatically opens and remains open and cannot be closed by manual manipulation when the toaster support unit is in collapsed position.

Fifth, to provide a structure having these advantages including means for adjustably supporting the toaster unit and for supporting it in its extended use position and which is simple and economical in structure and is not subjected to distortion or wear stresses in use.

Objects relating to details and economies of the invention will appear from the description to follow. The invention is defined and pointed out in the claims.

A preferred embodiment of the invention is illustrated in the accompanying drawing, in which:

FIG. 5 is an enlarged fragmentary view partially in vertical section with the toaster in extended position, mainly in vertical section, parts being broken away to show structural details, the toaster unit being conventionally illustrated by dotted lines.

FIG. 6 is a sectional view corresponding to that of FIG. 5 with the toaster unit in collapsed position, the toaster being indicated by dotted lines.

Figure 1:
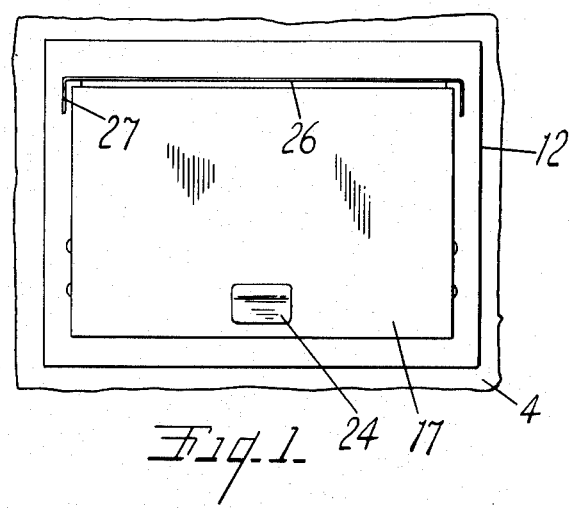
FIG. 1 is a front elevational view of the structure embodying my invention installed in a wall which is conventionally shown, the toaster support unit being in collapsed position.

It should be understood that the toaster member designated by the numeral 1 is a commercial type having openings 2 in the top thereof adapted to receive slices of bread. The bread supporting means is not illustrated but the toaster member 1 is of the type provided with a slide support having a fingerpiece 3 projecting from one end of the housing which is thrust downwardly when the slices are inserted and is automatically released to eject the slices to removal position when the toasting thereof is completed.

It will be understood that the electrical heating means is housed within the body portion. My invention does provide means for controlling the electrical connection to the toaster unit as will be pointed out.

In the accompanying drawings 4 represents a wall, and 5 studs, these parts being conventionally illustrated. The wall 4 has an opening 6 therein adapted to receive the housing unit designated generally by the numeral 7 and which comprises a rear wall 8, top wall 9, bottom wall 10 and side walls 11. These top, bottom and side walls are dimensioned so that portions of their forward ends project from the wall 4 and they are surrounded by wall-engaging flanges 12 having inwardly projecting portions which conceal the opening in the wall in which the housing unit is disposed. The housing unit is fixedly secured to the studs 5 as by means of screws 13, only one of which is shown.

The toaster support member comprises a bottom portion 14 having an upwardly projecting flange 15 on its front edge and upwardly projecting flanges 16 on its side or end edges. The front panel or housing closure member 17 has inwardly projecting side flanges 18 and the member 17 is fixedly secured to the front end of the bottom member 14. The toaster support member is provided at its rear end with a bracket comprising a rear portion 19 and end portions 20, this bracket being fixedly secured to the end members 16 of the bottom 14, the securing means not being illustrated but the parts are desirably secured by spot welding.

Figure 2:
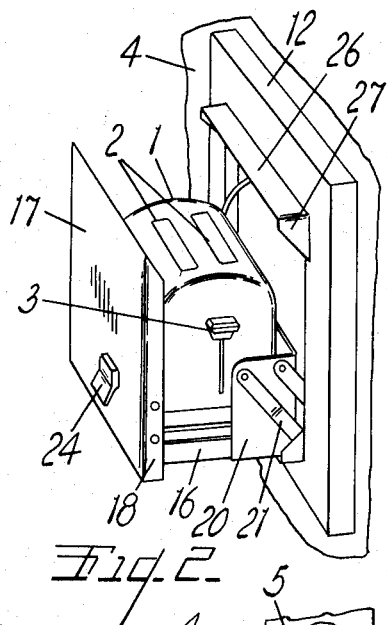
FIG. 2 is a fragmentary perspective view with the toaster unit in extended use position.

As stated, the toaster unit support member is mounted to be collapsed within the housing and withdrawn therefrom, the supporting means comprising pairs of parallel links 21, the lower ends of which are disposed within the housing and supportedly secured to the side walls thereof by pivots 22. The upper ends of these links 21 are disposed on the outer sides of the bracket end members 20 and pivotally secured thereto by the pivots 23; see FIGS. 2, 5 and 6. These pairs of links are disposed in parallel relation. With this arrangement, a pull on the handle 24 mounted on the front wall or panel 17 withdraws the toaster support member from the housing and an inward thrust or push on the handle 24 collapses the toaster support member and the toaster mounted thereon into the housing, as is illustrated in FIG. 6. With the parts thus arranged, a simple outward pull adjusts the toaster to use position and a push or thrust collapses it to housed position. The front wall is provided with rearwardly projecting flanges 18 on its side edges which engage the edges of the housing side walls when the toaster unit support is in collapsed position.

Figure 4:
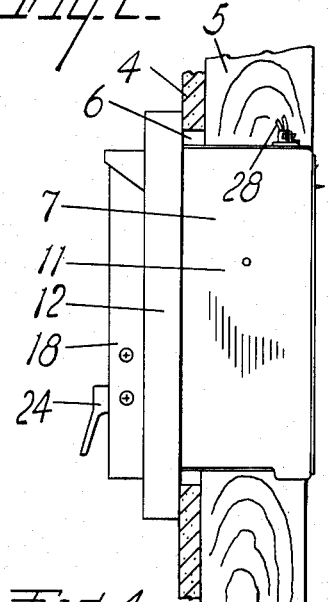
FIG. 4 is a side elevational view of the toaster of my invention installed in an opening in the wall, a fragment of the wall being shown in vertical section.

In the embodiment illustrated the housing is provided with a forwardly projecting top portion 26 provided with supporting brackets 27 at its end. The front wall flanges 18 engage the housing with this flange 26 overhanging the upper end of the front wall, as is illustrated in FIGS. 4 and 6, which results in a closure for the toaster unit. This not only serves to conceal the toaster when not in use but protects it from dust and the like.

For the installation of my invention illustrated, connecting circuit wires 28 are shown conventionally between the wall studs 5, the current source not being illustrated.

The circuit control switch designated generally by the numeral 29 is of a commercial type and therefore details are not illustrated except that it is of the thrust closing so called push button type and is provided with a push button 30 which closes the switch when it is pushed inwardly. The housing unit is provided with a forwardly projecting portion 31 which the push button automatically engages when the toaster support member is adjusted to use position as is illustrated in FIG. 5; the position the push button would occupy if it were not actuated by engagement with the fixed part of the housing as is indicated by dotted lines in FIG. 5. When the support member is swung upwardly from use position, the switch automatically opens and the housing is provided with a downwardly offset or recessed portion 32 adapted to receive the push button in its extended or open position, as illustrated in FIG. 6. The switch is connected by the flexible extension or circuit connection 33 to the wires 28, a support member 34 for the portion 33 of the circuit wires being mounted within the housing to support the wires 33 while permitting the flexing thereof as results from the adjustment of the toaster support member from its use position to collapsed position within the housing, and vice versa; see FIGS. 5 and 6.

With this arrangement, the circuit strands 33 are not subjected to stress other than the flexing or bending thereof.

As stated, I have not illustrated or described the switch or its mounting in detail as the switch is of a commercial type but it is of importance that it be of the type which is actuated to closed position by thrust on what, as stated, is commonly called "push button" 30 and that it automatically opens when the thrust thereon is relieved as results when the support member is lifted from its use position and the switch remains open until the toaster support unit is returned to use position. As stated, all that is necessary to do to adjust to use position is to pull outwardly on the handpiece 24.

Figure 3:
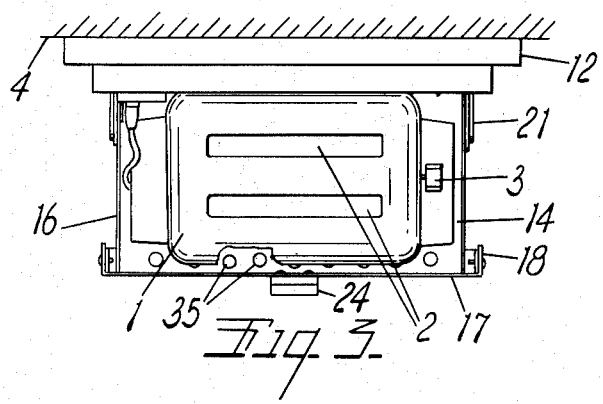
FIG. 3 is a plan view with the toaster unit in its extended use position, a wall section being conventionally illustrated.

In the embodiment illustrated, as is most clearly illustrated in FIG. 3, the toaster support bottom member is provided with a series of air inlet openings 35 which facilitate the circulation of air to the toaster unit which has air inlet openings in the bottom, as is illustrated by dotted lines 36 in FIGS. 3, 5 and 6.

I have illustrated and described my invention in a desirable embodiment thereof. I have not attempted to illustrate or describe other embodiments or adaptations as it is believed that this disclosure will enable those skilled in the art to embody or adapt my invention as may be desired.

Having thus described the invention, what is claimed as new and desired to secure by Letters Patent is:

1. A toaster apparatus comprising a housing unit adapted to be positioned in an opening in a wall and including a rear wall and top, bottom and side walls, the top, bottom and side walls having laterally projecting wall engaging flanges on their outer edges, a toaster support member comprising a bottom having upwardly projecting flanges on its front and side edges, a front panel supportedly mounted on said bottom and dimensioned to constitute a closure for said housing and provided with a handle, a bracket comprising rear and end members fixedly mounted on said support member to project upwardly from the rear and ends thereof, pairs of parallel links pivotally mounted at their lower ends on the inner sides of the side walls of said housing and at their upper ends on the outer sides of said end members of said bracket whereby said toaster support member is swingably adjustable to position it at the front of the housing or to collapse it into the housing with its front panel closing the housing, said housing having a forwardly projecting portion at its upper end which overhangs said front panel when said toaster support member is positioned within said housing, said toaster support member bottom having air inlets therein disposed adjacent said front wall, an electric toaster unit supportedly disposed within said toaster support member and dimensioned to be completely housed within said housing when said toaster support member is in collapsed position and which is disposed for use when said support member is in its extended use position, a circuit controlling switch of the thrust closing type mounted on said support member at the rear side thereof, said housing having a portion which said switch automatically engages and by which it is held in closed position when said toaster member is adjusted to use position, the bottom of said housing having a recess therein disposed to receive the circuit closing member of said switch when said support member is in retracted position within said housing, said switch having flexible circuit connections of such length as to permit adjustment of the toaster member from and to within said housing, said housing having means for supporting said circuit connections positioned to be above said toaster unit when it is positioned within said housing.

2. A toaster apparatus comprising a housing unit adapted to be positioned in an opening in a wall and including a rear wall and top, bottom and side walls, a toaster support member comprising a bottom having upwardly projecting flanges on its front and side edges, a front panel supportedly mounted on said bottom and dimensioned to constitute a closure for said housing and provided with a handle, a bracket comprising rear and end members fixedly mounted on said support member to project upwardly from the rear and ends thereof, pairs of parallel links pivotally mounted at their lower ends on the inner sides of the side walls of said housing and at their upper ends on the outer sides of said end members of said bracket whereby said toaster support member is swingably adjustable to position it at the front of the housing or to collapse it into the housing with its front panel closing the housing, said toaster support member bottom having air inlets therein disposed adjacent said front wall, an electric toaster unit supportedly disposed within said toaster support member and dimensioned to be completely housed within said housing when said toaster support member is in collapsed position and which is disposed for use when said support member is in its extended use position, and a circuit controlling switch of the thrust closing type mounted on said support member at the rear side thereof, said housing having a portion which said switch automatically engages and by which it is held in closed position when said toaster member is adjusted to use position, the bottom of said housing having a recess therein disposed to receive the circuit closing member of said switch when said support member is in retracted position within said housing, said switch having flexible circuit connections of such length as to permit adjustment of the toaster member from and to within said housing, said housing having means for supporting said circuit connections positioned to be above said toaster unit when it is positioned within said housing.

3. A toaster apparatus comprising a housing unit adapted to be positioned in an opening in a wall and including a rear wall and top, bottom and side walls, the top, bottom and side walls having laterally projecting wall engaging flanges on their outer edges, a toaster support member comprising a bottom having upwardly projecting flanges on its front and side edges, a front panel supportedly mounted on said bottom and dimensioned to constitute a closure for said housing and provided with a handle, a bracket comprising rear and end members fixedly mounted on said support member to project upwardly from the rear and ends thereof, pairs of parallel links pivotally mounted at their lower ends on the inner sides of the side walls of said housing and at their upper ends on the outer sides of said end members of said bracket whereby said toaster support member is swingably adjustable to position it at the front of the housing or to collapse it into the housing with its front panel closing the housing, said housing having a forwardly projecting portion at its upper end which overhangs said front panel when said toaster support member is positioned within said housing, said toaster support member bottom having air inlets therein disposed adjacent said front wall, and an electric toaster unit supportedly disposed within said toaster support member and dimensioned to be completely housed within said housing when said toaster support member is in collapsed position and which is disposed for use when said support member is in its extended use position.

4. A toaster apparatus comprising a housing unit adapted to be positioned in an opening in a wall and including a rear wall and top, bottom and side walls, a toaster support member comprising a bottom having upwardly projecting flanges on its front and side edges, a front panel supportedly mounted on said bottom and dimensioned to constitute a closure for said housing and provided with a handle, a bracket comprising rear and end members fixedly mounted on said support member to project upwardly from the rear and ends thereof, pairs of parallel links pivotally mounted at their lower ends on the inner sides of the side walls of said housing and at their upper ends on the outer sides of said end members of said bracket whereby said toaster support member is swingably adjustable to position it at the front of the housing or to collapse it into the housing with its front panel closing the housing, said toaster support member bottom having air inlets therein disposed adjacent said front wall, an electric toaster unit supportedly disposed within said toaster support member and dimensioned to be completely housed within said housing when said toaster support member is in collapsed position and which is disposed for use when said support member is in its extended use position.

5. A toaster apparatus comprising a housing unit adapted to be positioned in an opening provided therefor in a wall and including an inner wall and top, bottom and side walls having laterally projecting wall engaging flanges on their outer ends, a toaster support member comprising a bottom, a closure panel supportedly mounted on said bottom to project upwardly therefrom and dimensioned to constitute a closure for said housing unit, pairs of parallel links pivotally mounted at their lower ends on the inner sides of the side walls of the housing and at their upper ends on said toaster support member whereby said toaster support member is adjustably and guidably supported so that it may be manually manipulated to position it at the front of the housing or to collapse it into the housing with said closure panel closing the housing, said housing having a portion at its upper end which overhangs the upper edge of said closure panel when said toaster support member is positioned within the housing, an electric toaster unit supportedly mounted on said toaster support member bottom and dimensioned to be completely housed within said housing when said toaster support member is collapsed therein and which is disposed for use when said support member is in its extended position, said toaster support member having air inlets disposed to permit circulation of air upwardly relative to said toaster unit, and a circuit control switch of the in-thrust closing and outwardly automatically opening type mounted on said support member and operatively associated with said toaster unit, said housing having a switch actuating member which said switch automatically engages and which acts to held the switch in closed position when the toaster support member is adjusted to use position, the switch being open when said toaster support member is positioned within said housing.

6. A toaster apparatus comprising a housing unit adapted to be positioned in an opening provided therefor in a wall and including an inner wall and top, bottom and side walls, a toaster support member comprising a bottom, a closure panel supportedly mounted on said bottom to project upwardly therefrom and dimensioned to constitute a closure for said housing unit, pairs of parallel links pivotally mounted at their lower ends on the inner sides of the side walls of the housing and at their upper ends on said toaster support member whereby said toaster support member is adjustably and guidably supported so that it may be manually manipulated to position it at the front of the housing or to collapse it into the housing with said closure panel closing the housing, an electric toaster unit supportedly mounted on said toaster support member bottom and dimensioned to be completely housed within said housing member when said toaster support member is collapsed therein and which is disposed for use when said support member is in its extended position, and a circuit control switch of the in-thrust closing and outwardly automatically opening type mounted on said support member and operatively associated with said toaster unit, said housing having a switch actuating member which said switch automatically engages and which acts to hold the switch in closed position when the toaster support member is adjusted to use position, the switch being open when said toaster support member is positioned within said housing.

7. A toaster apparatus comprising a housing unit adapted to be positioned in an opening provided therefor in a wall and including an inner wall and top, bottom and side walls, a toaster support member comprising a bottom, a closure panel supportedly mounted on said bottom to project upwardly therefrom and dimensioned to constitute a closure for said housing unit, pairs of parallel links pivotally mounted at their lower ends on the inner sides of the side walls of the housing and at their upper ends on said toaster support member whereby said toaster support member is adjustably and guidably supported so that it may be manually manipulated to position it at the front of the housing or to collapse it into the housing with said closure panel closing the housing, an electric toaster unit supportedly mounted on said toaster support member bottom and dimensioned to be completely housed within said housing member when said toaster support member is collapsed therein and which is disposed for use when said support member is in its extended position, and a circuit control switch of the in-thrust closing and outwardly automatically opening type mounted on said support member and operatively associated with said toaster unit, said housing having a switch actuating member which said switch automatically engages and which acts to hold the switch in closed position when the toaster support member is adjusted to use position, the switch being open when said toaster support member is positioned within said housing, there being flexible circuit connections to said switch of such length as to permit adjustment of the toaster support member to and from the housing, the housing having means for supporting said circuit connections positioned to prevent entanglement of the circuit connections in the adjustment of said toaster unit to and from use position.

8. A toaster apparatus comprising a housing unit of rectangular cross section adapted to be positioned in an opening in a wall dimensioned to receive the same, the bottom and side walls of the housing having laterally spaced wall engaging flanges on their outer edges, a toaster support member comprising a bottom and a front panel constituting a housing closure and toaster guard member supportedly mounted on said bottom to project upwardly therefrom, pairs of parallel links pivotally mounted at their lower ends on the inner sides of the side walls of said housing and pivotally connected at their upper ends to said toaster support member in vertically spaced relation to the bottom thereof and by which the toaster support member is swingably adjustable to position it in use position at the front of the housing or to collapse it into the housing with the said front panel in housing closing position, said housing having a forwardly projecting portion which overhangs said front panel when it is in closed position, an electric toaster unit supportedly disposed on said toaster support member, and a control switch for said toaster unit mounted on said support member, said housing being provided with means with which said switch engages to close the switch when said toaster support member is adjusted to use position, said switch having flexible circuit connections supportedly mounted within said housing and of such length as to permit the adjustment of said toaster unit to and from use position.

9. A toaster apparatus comprising a housing unit adapted to be positioned in an opening in a wall dimensioned to receive the same, a toaster support member comprising a bottom and a front panel constituting a housing closure and toaster guard member supportedly mounted on said bottom to project upwardly therefrom, pairs of parallel links pivotally mounted at their lower ends on the inner side of said housing and pivotally connected at their upper ends to said toaster support member in vertically spaced relation to the bottom thereof and by which the toaster support member is swingably adjustable to position it in use position at the front of the housing or to collapse it into the housing with the said front panel in housing closing position, an electric toaster unit supportedly disposed on said toaster support member and a control switch for said toaster unit mounted on side support member, said housing being provided with means with which said switch engages to close the switch when said toaster support member is adjusted to use position, said switch having flexible circuit connections supportedly mounted within said housing and of such length as to permit the adjustment of said toaster unit to and from use position.

10. A toaster apparatus comprising a housing unit adapted to be positioned in an opening in a wall dimensioned to receive the same, a toaster support member comprising a bottom and a front panel constituting a housing closure and toaster guard member supportedly mounted on said bottom to project upwardly therefrom, pairs of parallel links pivotally mounted at their lower ends on the inner side of said housing and pivotally connected at their upper ends to said toaster support member in vertically spaced relation to the bottom thereof and by which the toaster support member is swingably adjustable to position it in use position at the front of the housing or to collapse it into the housing with the said front panel in housing closing position, an electric toaster unit supportedly disposed on said toaster support member, said toaster support bottom member having air inlets therein and a control switch of the self-opening type mounted on said support member, said housing being provided with means with which said switch engages to close the switch and hold it closed when said toaster support member is adjusted to use position, said switch having flexible circuit connections supportedly mounted within said housing and of such length as to permit the adjustment of said toaster unit to and from use position.

11. A toaster apparatus comprising a housing unit adapted to be positioned in an opening in a wall, a toaster support member including a housing closure member, links pivotally mounted at their lower ends within said housing and pivotally connected at their upper end to said toaster support member so that said toaster support member may be swingably adjusted to position it at the front of the housing or to a housed position within the housing with the housing closure member closing said housing, a toaster unit supportedly mounted on said toaster support member at the inner side of said housing closure member, and electrical connections for said toaster unit disposed within said housing, the inner end of which is connected to an electrical source and supportedly mounted within said housing, the outer end being connected to said toaster unit by means of a switch of the thrust closing type mounted on said support member, said housing having a portion with which said switch automatically engages and is held in closed position when the toaster support member is adjusted to its extended use position at the outside of said housing, said housing having a switch actuating member mounted thereon and with which said switch automatically engages and which acts to hold the switch in closed position when the toaster support member is adjusted to its use position at the outside of said housing, said housing having a portion receiving the switch in open position when the support member is in its retracted position within said housing.

References Cited by the Examiner

UNITED STATES PATENTS

| | | | |
|---|---|---|---|
| 1,341,994 | 6/20 | Nelson | 312—223 X |
| 1,441,410 | 1/23 | Eustis | 312—50 X |
| 1,698,499 | 1/29 | Horning | 312—27 X |
| 1,844,572 | 2/32 | Gourley | 312—223 |
| 2,412,270 | 12/46 | Johnston | 312—223 X |
| 2,514,001 | 7/50 | Knuth | 312—213 |
| 2,537,669 | 1/51 | Honig | 312—269 |
| 2,572,151 | 10/51 | Hoppe | 312—266 |

FRANK B. SHERRY, *Primary Examiner.*

CHANCELLOR E. HARRIS, *Examiner.*